United States Patent [19]
Enright et al.

[11] Patent Number: 5,888,386
[45] Date of Patent: Mar. 30, 1999

[54] SWIMMING POOL SKIMMER AND CHLORINATOR APPARATUS

[76] Inventors: Dan P. Enright, 2147 Middle Creek, Kingwood, Tex. 77339; Matt W. Anderson, 16022 Constitution La., Friendswood, Tex. 77546

[21] Appl. No.: 946,031

[22] Filed: Oct. 7, 1997

[51] Int. Cl.$^6$ ................................................. E04H 3/16
[52] U.S. Cl. ........................ 210/169; 210/206; 210/232
[58] Field of Search ................................... 210/169, 205, 210/206, 232

[56] References Cited

U.S. PATENT DOCUMENTS

| | | | |
|---|---|---|---|
| 3,677,408 | 7/1972 | Dinizo, Jr. | 210/169 |
| 3,684,460 | 8/1972 | Arneson | 23/267 |
| 3,749,244 | 7/1973 | Jannuzzi, Jr. | 210/169 |
| 3,765,534 | 10/1973 | West et al. | 210/169 |
| 3,792,979 | 2/1974 | Clinton | 23/267 |
| 4,217,331 | 8/1980 | Schaub | 422/265 |
| 4,584,106 | 4/1986 | Held | 210/754 |
| 5,124,032 | 6/1992 | Newhard | 210/169 |
| 5,234,588 | 8/1993 | Aymes | 210/206 |

*Primary Examiner*—Jan H. Woo
*Assistant Examiner*—Betsey J. Morrison
*Attorney, Agent, or Firm*—David M. O'Brian

[57] ABSTRACT

A swimming pool skimmer and chlorinator apparatus for use with a conventional pool skimmer system. The swimming pool skimmer and chlorinator apparatus preferably includes an axially bi-sectioned basket member which preferably collects skimmed debris in an upper axial portion and preferably retains water purifying chemicals in a lower axial portion, to generally eliminate incidental direct human contact with the water purifying chemicals. The swimming pool skimmer and chlorinator apparatus also preferably includes a connector to connect the separate axial portions of the bi-sectioned basket member and a security mechanism to generally prevent unintentional separation of the axial portions of the bi-sectioned basket member. The swimming pool skimmer and chlorinator apparatus requires the undertaking of a proactive step, such as disconnecting the security mechanism and separating the axial portions of the bi-sectioned basket member, to access the portion of the bi-sectioned basket member which may contain the water purifying chemicals.

20 Claims, 4 Drawing Sheets

SWIMMING POOL SKIMMER AND CHLORINATOR APPARATUS

FIELD OF THE INVENTION

The present invention relates generally to a swimming pool skimmer and chlorinator apparatus for use with a conventional pool skimmer system, which generally comprises a trap area, a debris strainer and weir in fluidic communication with a pool water inlet. Specifically, the present invention relates to a swimming pool skimmer and chlorinator apparatus for replacement of a conventional strainer device typically inserted into a pool skimmer trap, generally located in a side wall of a swimming pool. The present invention has particular application for receiving and collecting debris from the water in a swimming pool, while simultaneously providing a preferred, safe and effective apparatus to store and disperse water purifying chemicals to the swimming pool. The present invention requires the undertaking of a proactive step to access the portion of the invention which may contain the water purifying chemicals.

BACKGROUND OF THE INVENTION

The safe and efficient handling and distribution of swimming pool chemicals and the efficient removal of surface water debris from swimming pools is a constant maintenance requirement. Swimming pool chemicals, in the past, have been dispersed into swimming pools using a variety of methods including: manually broadcasting such chemicals into the pool, the use of floating devices which continually add chemicals to the water, chlorine generators and free-standing chlorinators. The manual broadcast of chemicals is inefficient and dangerous to the handler. The use of flotation devices exposes chemicals such as chlorine to damaging UV rays. Additionally, flotation devices are inefficient, unsightly, generally lack chemical stability and uniform release, and may create chemical concentration in a particular area of the pool. Further, flotation devices are dangerously accessible to children, require maintenance and generally result in a high rate of chemical deterioration. The use of a chlorine generator is expensive, requires excessive maintenance, normally has a high rate of component failure and replacement, and generally requires pool system modification. The use of free-standing chlorinators requires contact between the operator and the chemical, excessive maintenance and cleaning, and pool system modification.

Conventional swimming pools typically include a water filtration system and a method of purifying the swimming pool water. The generally accepted water filtration system includes a pump which circulates water within the swimming pool, causing the swimming pool water to pass through a variety of filters and filtering devices. One filtering device which is common to most swimming pools is a pool skimmer which is typically installed in the side wall of the swimming pool, at or about the desired water level. Conventional pool skimmer devices may generally include a "trap" installed adjacent to an opening in the side wall of the swimming pool, wherein a weir or flap door may be installed in the opening which allows surface debris to float over the weir and into the trap. Once the debris has floated over the weir, the weir closes the opening as water and debris attempt to egress from trap, thus preventing the debris from returning to the swimming pool area. Normally, a strainer can be inserted in the trap to act as a primary filter device in collecting debris in the trap. Depending upon the time of year and the amount of debris allowed to enter the pool, pool skimmer strainers may need to be emptied as often as once a day, but in any event, strainers should normally be emptied on a regular basis.

These types of strainers can also be used to store and/or disperse water purifying and pH adjusting chemicals, such as chlorine, hypochlorite, algecide, soda ash and acid used in purifying and maintaining the water chemistry of the pool water. While pool skimmer strainers may be used to store and disperse these types of chemicals, the strainers must be periodically handled by the home owner and/or a pool maintenance provider. Unfortunately, pool skimmers and strainers present a natural curiosity to children and teenagers and are often times accessed wherein the water purifying chemicals are handled in a dangerous manner.

The intentional and incidental contact and handling of chemically laden pool strainers is cause for great concern. Chemicals such as chlorine are oxidizers which remove skin oils, and cause burning and irritation to the skin. Ingestion and/or inhalation of chlorine may cause gastrointestinal damage, coughing, choking, vomiting, nausea, headache and dizziness. Muriatic acid which is generally used to lower the pH and soda ash which is generally used to increase the pH in swimming pools, may both be dispersed in the pool skimmer system. Direct human contact with muriatic acid and soda ash should be avoided, as contact with these chemicals may result in among other complications, serious burns and irritation to the skin and lining of the lungs. Thus it would be advantageous to have a strainer device for use in conventional pool skimmer systems, which could be easily cleaned, while generally avoiding direct contact with hazardous chemicals typically stored and/or dispersed through the pool skimmer system.

Additionally, it would be advantageous to have a combined swimming pool skimmer and chlorinator device which generally collects debris which floats over the weir and can easily be cleaned, and a chlorinator device which generally prevents unintentional direct human contact with the chemicals stored in the strainer.

In view of the lack of such a device which safely stores and disperses chemicals in swimming pools and provides a safe and effective apparatus for collecting and removing debris collected at the pool skimmer area, a need for the present invention exists.

SUMMARY OF THE INVENTION

To achieve the foregoing features and advantages and in accordance with the purpose of the invention as embodied and broadly described herein, a preferred embodiment swimming pool skimmer and chlorinator apparatus is provided for use with a standard pool skimmer system, generally located in a side wall of a swimming pool. The preferred embodiment swimming pool skimmer and chlorinator apparatus may preferably include a bi-sectioned basket member, having a an upper axial portion and a distinct and separate lower axial portion, a connector attaching the upper axial portion with the lower axial portion to connect the two axial portions together and a security mechanism to keep the two axial portions engaged to one another. The upper axial portion of the bi-sectioned basket member may be concentrically positioned in axial alignment with the lower axial portion, and each portion preferably includes a frustro-conical side wall, having a plurality of perforations therein. The upper axial portion of the bi-sectioned basket member also preferably includes a perforated base, which is designed to strain debris entering the skimmer, while allowing primary filtered pool water to pass into the lower axial portion of the bi-sectioned basket member. The lower axial portion of the bi-sectioned basket member is designed to preferably retain and disperse various water purifying chemicals such as, for example, chlorine tablets or sticks. In separating the debris collecting portion or upper axial portion of the bi-sectioned basket member from the chemical dispersing portion or lower axial portion of the bi-sectioned basket member, the upper axial portion can be accessed and cleaned while generally avoiding direct exposure to the chemicals retained in the lower axial portion. This distinct separation of the debris collecting portion from the chemical retaining portion, is intended to generally avoid direct contact of hazardous swimming pool chemicals with small children and others in the pool area. In developing a bi-sectioned basket member with similar dimensions as conventional strainers used in pool skimmers, the present invention is designed to replace strainers without the need for retrofitting, modifying or rebuilding the existing skimmer facility. Additionally, by separating the skimmed debris in the upper axial portion from the chemicals retained in the lower axial portion, visual inspection of the amount of chemicals remaining in the lower axial portion is made easier and safer.

One objective of the present invention is to provide an inexpensive swimming pool skimmer and chlorinator apparatus, which efficiently disperses water purifying chemicals into a swimming pool and generally prevents direct human contact with the water purifying chemicals.

Still another objective of the present invention is to provide a swimming pool skimmer and chlorinator apparatus which requires the undertaking of a proactive step, such as disconnecting the security mechanism and separating the axial portions of the bi-sectioned basket member, for a human to access the portion of the bi-sectioned basket member which may contain the water purifying chemicals.

Another objective of the present invention is to provide a swimming pool skimmer and chlorinator apparatus which is compatible with existing pool skimmer systems and replaces conventional strainers.

Further, an objective of the present invention is to provide a swimming pool skimmer and chlorinator apparatus which requires a simple visual check to monitor the amount of water purifying chemicals being used in the swimming pool.

Yet another objective of the present invention is to provide a swimming pool skimmer and chlorinator apparatus which is compatible for use with conventional pool chemical concentrations, such as sticks, pellets, tablets and granules.

Still another objective of the present invention is to provide a swimming pool skimmer and chlorinator apparatus wherein the skimmed debris can be removed while generally avoiding exposure to or contact with the water purifying chemicals.

An additional objective of the present invention is to provide a swimming pool skimmer and chlorinator apparatus which generally avoids the problem of noxious fume build-up, common in free-standing chlorinators and chemically laden floating devices.

Moreover, another objective of the present invention is to provide a swimming pool skimmer and chlorinator apparatus which generally keeps the water purifying chemicals below water level, thereby reducing dissipation of the chemical into the atmosphere.

BRIEF DESCRIPTION OF THE DRAWINGS

The accompanying drawings which are incorporated into and constitute a part of this specification, illustrate a preferred embodiment of the invention and together with the general description of the invention given above and the detailed description of the preferred embodiment given below, serve to explain the principals of the invention.

The above general description and the following detailed description are merely illustrative of the generic invention and additional modes, advantages and particulars will be readily suggested to those skilled in the art without departing from the spirit and scope of the invention.

DETAILED DESCRIPTION OF THE INVENTION

Figure 1:
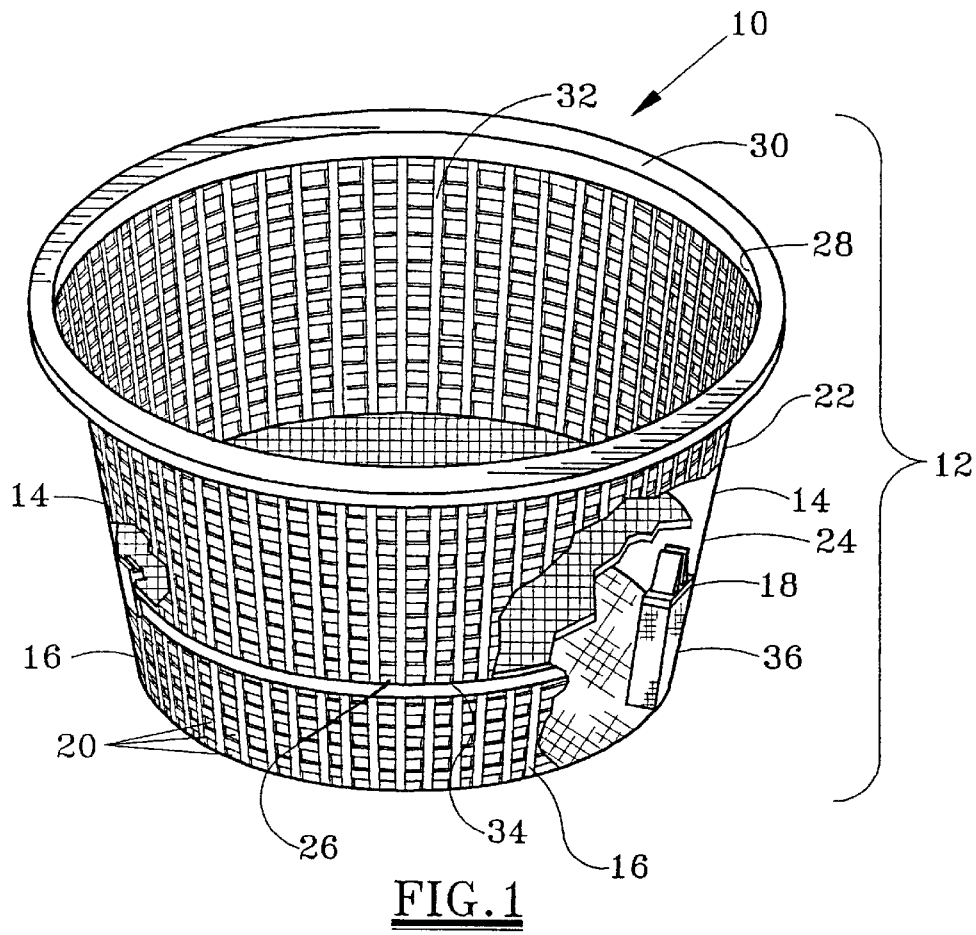
FIG. 1 is a perspective side view of the preferred embodiment pool skimmer and chlorinator apparatus.
Figure 1A:
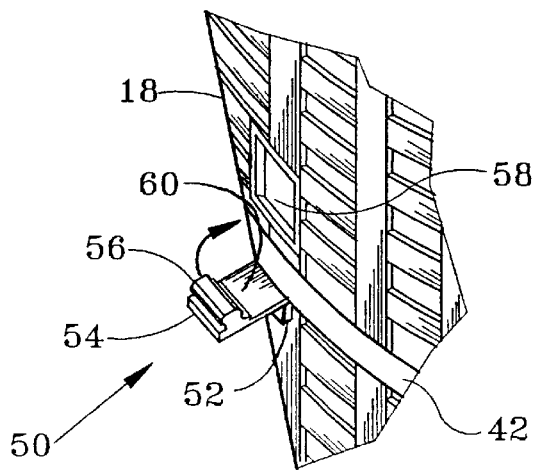
FIG. 1A is an enlarged, partial perspective view of the hinge member of the preferred embodiment pool skimmer and chlorinator apparatus, depicted in FIG. 1.
Figure 4:
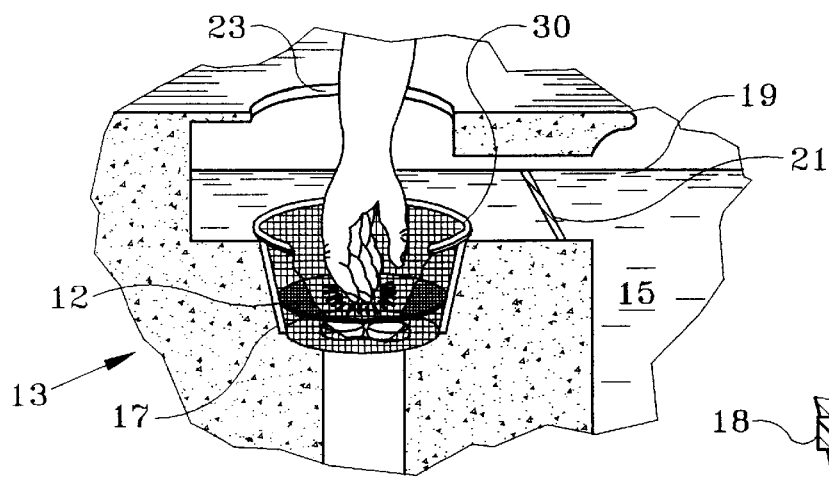
FIG. 4 is a perspective side view of the preferred embodiment pool skimmer and chlorinator apparatus positioned in a conventional pool skimmer trap.
Figure 5A:
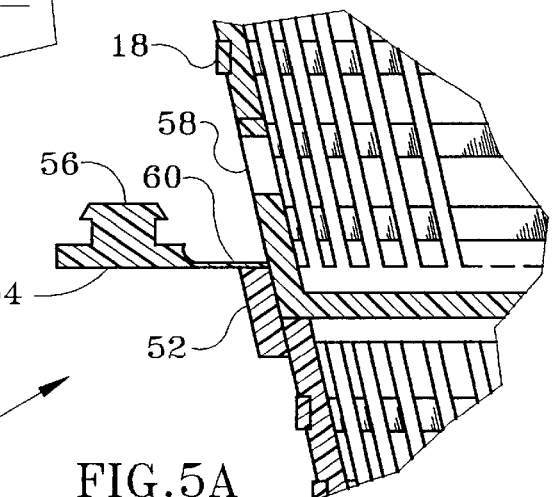
FIG. 5A is an enlarged side view of the hinge member of the preferred embodiment pool skimmer and chlorinator apparatus, depicted in FIG. 5.
Figure 5:
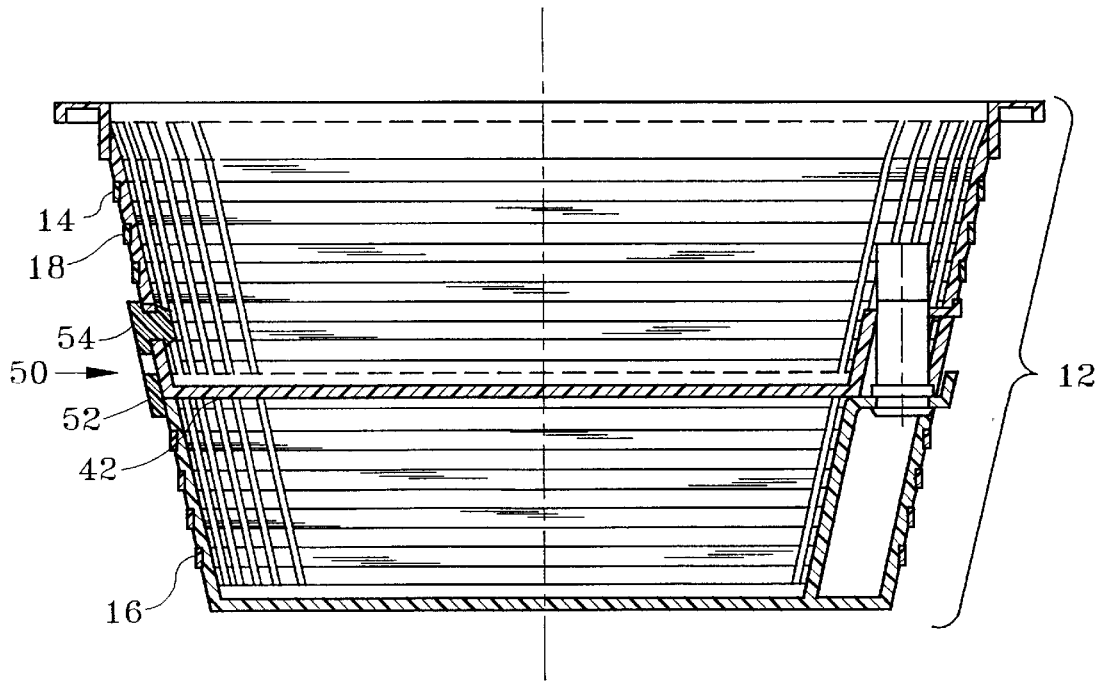
FIG. 5 is a side view of the preferred embodiment pool skimmer and chlorinator apparatus.

With reference to the drawings wherein like parts are designated by like numerals, FIG. 1 illustrates the present invention, a preferred embodiment swimming pool skimmer and chlorinator apparatus 10. With reference to FIGS. 1–6B, the preferred embodiment swimming pool skimmer and chlorinator apparatus 10 includes a bi-sectioned basket member 12, having an upper axial portion 14 and a lower axial portion 16, wherein the upper and lower axial portions 14, 16 are preferably engaged in axial alignment with each other. The bi-sectioned basket member 12 can be constructed of a variety of synthetic materials such as, for example nylon, plastic, polyvinlychloride, copolymer polypropylene and other materials. The bi-sectioned basket member 12 preferably has the same structural dimensions as a conventional strainer basket (not shown) used in conventional swimming pool skimmer systems 13, illustrated in FIGS. 3 and 4. The upper axial portion 14 of the bi-sectioned basket member 12 is designed to receive and retain a quantity of skimmed debris (not shown) from the water in the swimming pool 15. The lower axial portion 16 of the bi-sectioned basket member 12 is designed to store water purifying chemicals 45 such as, for example, chlorine sticks or bromide tablets. The upper axial portion 14 of the bi-sectioned basket member 12 generally includes a first frustro-conical side wall 18 having a plurality of perforations 20 therein. The side wall 18 of the upper axial portion 14 further includes a first upper vertical section 22 and a first lower vertical section 24. The first lower vertical section 24 generally has a smaller circumference at a lower most portion 26 as compared to an upper most portion 28 of the first upper vertical section 22. As illustrated in FIG. 1, the upper axial portion 14 also preferably includes a collar member 30 affixed to the upper vertical section 22, at or near to the upper most portion 28. The conventional pool skimmer system 13 generally includes a skimmer trap 17, a subsurface opening 19 between the pool 15 and the trap 17, a weir 21 located within the subsurface opening 19 and a surface opening 23 through which the bi-sectioned basket member 12 can be retrieved. The bi-sectioned basket member 12 and the collar member 30 are designed to be received securely within the trap 17 of the conventional pool skimmer system 13, as shown in FIG. 4.

Figure 2:
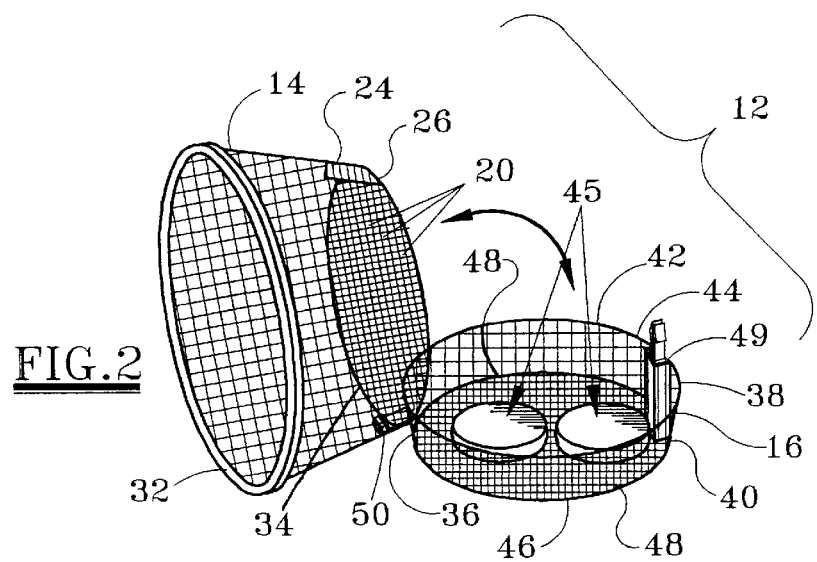
FIG. 2 is a front view of the preferred embodiment pool skimmer and chlorinator apparatus, illustrating the hinge feature.
Figure 3:
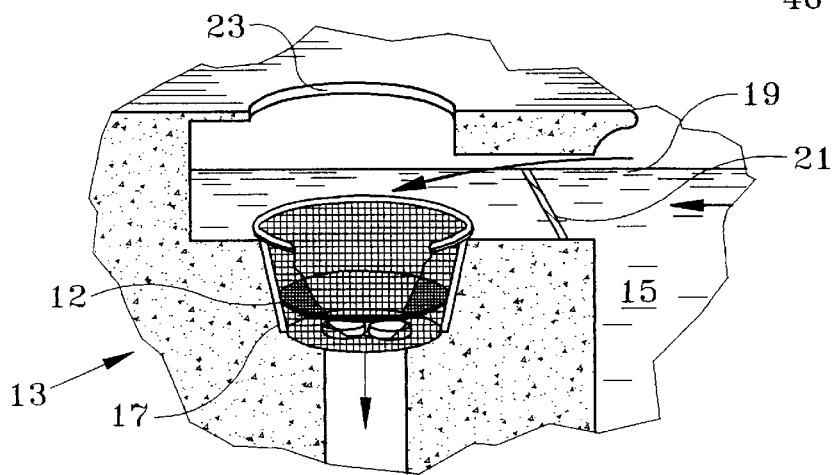
FIG. 3 is a cross-sectional view of the preferred embodiment pool skimmer and chlorinator apparatus positioned in a conventional pool skimmer trap.

As illustrated in FIGS. 1 and 2, a first concentric opening 32 in the upper axial portion 14 of the bi-sectioned basket member 12 is defined by the inner diameter of the collar member 30. A first base member 34 is integrally formed with or otherwise attached to the lower most portion 26 of the first lower vertical section 24. The first base member 34 also includes a plurality of perforations 20 therein. The perforations 20 in the first base member 34 and the first side wall member 18 generally allow for the passage of filtered pool water, separate and collect the skimmed debris such as grass clippings, leaves, paper, mulch and insects, in the upper axial portion 14.

Figure 1B:
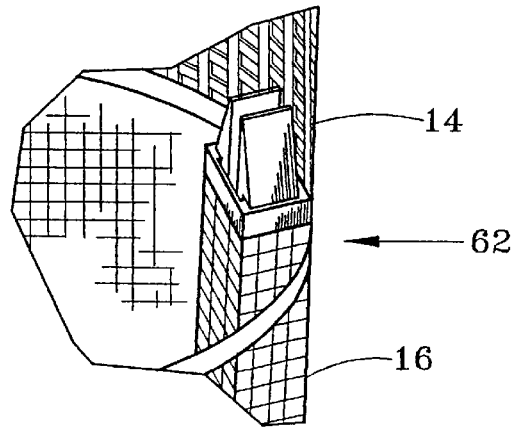
FIG. 1B is an enlarged, partial perspective view of the clip assembly of the preferred embodiment pool skimmer and chlorinator apparatus, depicted in FIG. 1.
Figure 1C:
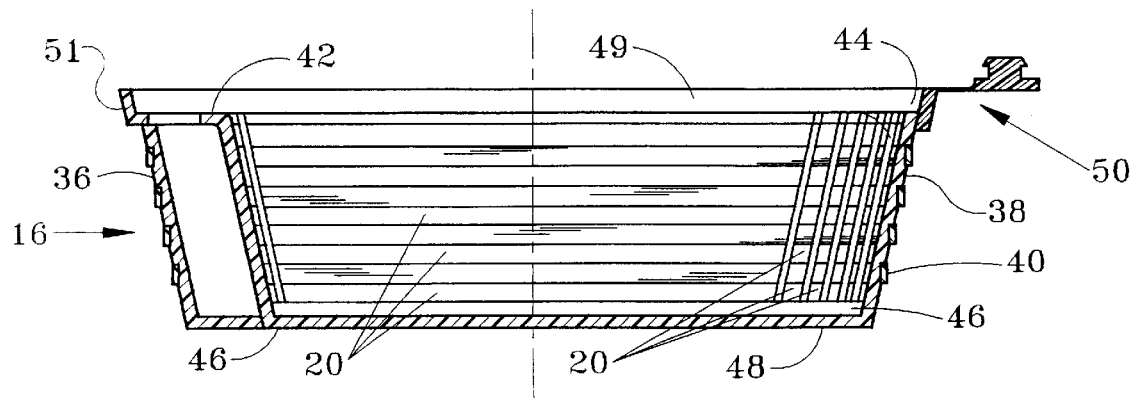
FIG. 1C is side view of the lower axial portion of the preferred embodiment pool skimmer and chlorinator apparatus, depicted in FIG. 1.

In FIG. 1C, the lower axial portion 16 of the bi-sectioned basket member 12 also includes a second frustro-conical side wall 36 having a plurality of perforations 20 therein. The lower axial portion 16 includes a second upper vertical section 38 and second lower vertical section 40. The second upper vertical section 38 of the lower axial portion 16 includes a reinforced ring member 42 affixed at an upper most portion 44 of the upper vertical section 38. The second lower vertical section 40 has a smaller circumference at a lower most portion 46 as compared to the upper most portion 44. A second concentric opening 49 is defined by the inner diameter of the reinforced ring member 42. The lower axial portion 16 also includes a second base member 48 which is integrally formed with or otherwise attached to a lower most portion 46 of the second lower vertical section 40. The filtered pool water passes through the perforations 20 in the first base member 34 into the lower axial portion 16, is then conditioned by the chemicals 45 in the lower axial portion 16 and subsequently passes through the plurality of perforations 20 in the second base member 48 and is preferably filtered again at a main pool filter (not shown) and circulated back into the swimming pool 15. A circumferential lip member 51 is affixed to the reinforced ring member 42, wherein the lip member 51 retains the first base member 34 therein.

As illustrated in FIGS. 1A, 2, 5 and 5A, the bi-sectioned basket member 12 also preferably includes a hinge member 50 which connects the upper axial portion 14 with the lower axial portion 16. The hinge member 50 generally includes a first leg member 52 fixedly attached to the reinforced ring member 42 and a second leg member 54 which permanently engages to the first side wall member 18 of the upper axial portion 14. The second leg member 54 also includes a plug portion 56 for selective insertion into a plug receiving portion 58 in the first side wall 18. The first leg member 52 is preferably joined to the second leg member 54 at a hinge connector 60. The insertion of the plug portion 56 into the plug receiving portion 58 is designed to be a permanent attachment. As depicted in FIG. 2, the hinge member 50 provides for selective pivotal movement between the upper axial portion 14 and the lower axial portion 16.

Figure 6A:
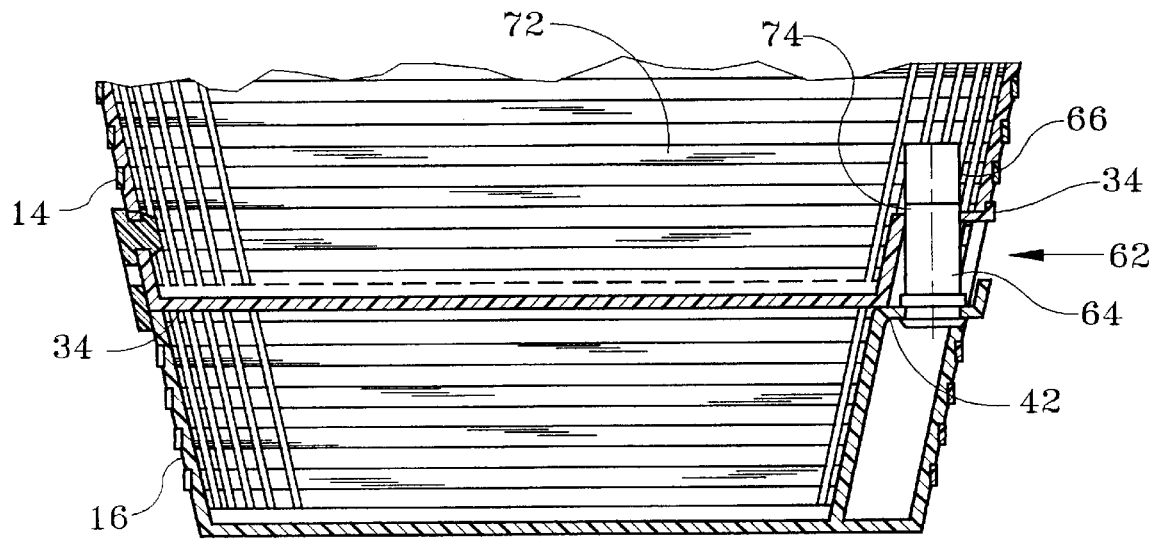
FIG. 6A is a side view of the clip assembly of the preferred embodiment pool skimmer and chlorinator apparatus.
Figure 6:
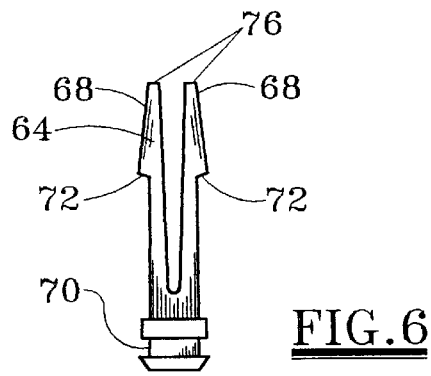
FIG. 6 is a side view of the clip member used in the preferred embodiment pool skimmer and chlorinator apparatus.
Figure 6B:
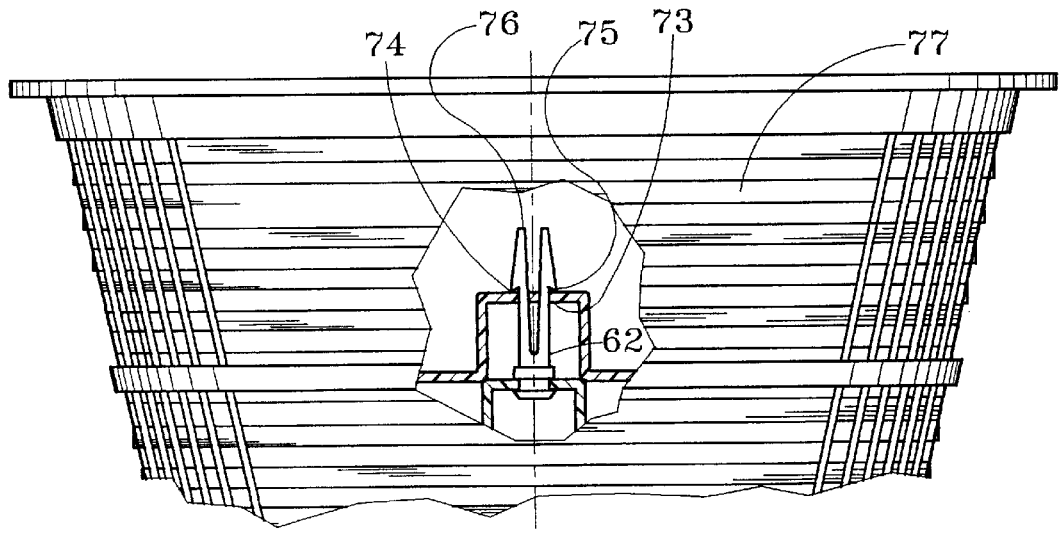
FIG. 6B is a partial cut away, cross-sectional, front view of the clip assembly of the preferred embodiment pool skimmer and chlorinator apparatus.

A clip assembly 62 is illustrated in FIGS. 1B, 6A and 6B wherein the clip assembly 62 serves as a security mechanism and releasably secures the upper axial portion 14 with the lower axial portion 16. The clip assembly 62 may for example, include an upstanding latch member 64, shown in FIG. 6, being affixed to the reinforced ring member 42, and a catch member 66 being formed in the first base member 34 of the upper axial portion 14 of the bi-sectioned basket member 12, as illustrated in FIG. 6A. The upstanding latch member 64 may further include two or more elongated, biased prongs 68 attached at a common base 70, wherein each said prong includes a shoulder portion 72 which engages the catch member 66. The catch member 66 may preferably be an inlet 74 formed in the first base member 34 for receiving the latch member 64. Each prong 68 may preferably have a first portion 73 for retention adjacent to the lower axial portion 16 and a second portion 75 for retention within an inner portion 77 of the upper axial portion 14. In order to secure the upper axial portion 14 to the lower axial portion 16, the shoulder portion 72 passes through the inlet 74, such that the shoulder portion 72 of each prong 68 is secured by the inlet 74. When the lower axial portion 16 is to be accessed, the bi-sectioned basket member 12 must be removed from the pool skimmer system 13 and the one or more prongs 68 are then squeezed together at a tip end 76 and gently pushed through the inlet 74, thus releasing the shoulder portion 72 from the inlet 74, causing the lower axial portion 16 to pivotally separate from the upper axial portion 14. In this manner, incidental access to the lower axial portion 16, which may preferably store and disperse water purifying chemicals 45, is generally avoided.

The foregoing description of the invention is illustrative and explanatory thereof. Various changes in the materials, apparatus, and particular parts employed will be apparent to those skilled in the art. It is intended that all such variations within the scope and spirit of the appended claims be embraced thereby.

What is claimed is:

1. A swimming pool skimmer and chlorinator apparatus for use in the filtering and chemical treatment of water in a swimming pool, comprising:

a bi-sectioned basket member, having an upper axial portion to receive and retain a quantity of skimmed debris from the swimming pool water and a lower axial portion to store a quantity of water purifying chemicals, wherein the upper axial portion generally separates the skimmed debris from the water purifying chemicals;

a connecting means, fixedly attached to the lower axial portion of said bi-sectioned basket member for permanent, pivotal engagement of the lower axial portion to the upper axial portion of said bi-sectioned basket member and to maintain vertical positioning of the upper axial portion of said bi-sectioned basket member above the lower axial portion of said bi-sectioned basket member; and a securing means, affixed to the upper axial portion of said bi-sectioned basket member and the lower axial portion of said bi-sectioned basket member, for releasably securing the upper axial portion of said bi-sectioned basket member to the lower axial portion of said bi-sectioned basket member.

2. The swimming pool skimmer and chlorinator apparatus, as defined in claim 1, wherein the upper axial portion of said bi-sectioned basket member comprises a first frustro-conical side wall having a first upper vertical section and a first lower vertical section, the first frustro-conical side wall having a plurality of perforations therein, the first lower vertical section having a smaller circumference at a lower most portion as compared to an upper most portion of the first upper vertical section.

3. The swimming pool skimmer and chlorinator apparatus, as defined in claim 2, wherein the first upper vertical section further includes a collar member affixed at the upper most portion of the first upper vertical section.

4. The swimming pool skimmer and chlorinator apparatus, as defined in claim 3, wherein the first upper vertical section further includes a first concentric axial opening, defined by an inner diameter of the collar member and the first upper vertical section also includes a first base member integrally formed with the lower most portion of the first lower vertical section, said first base member having a plurality of perforations therein, wherein the perforations in the side wall and base member allow for the passage of pool water therethrough.

5. The swimming pool skimmer and chlorinator apparatus, as defined in claim 1, wherein the lower axial portion of said bi-sectioned basket member comprises a second frustro-conical side wall having a plurality of perforations therein, the second frustro-conical side wall having a second upper vertical section and a second lower vertical section.

6. The swimming pool skimmer and chlorinator apparatus, as defined in claim 5, wherein the second upper vertical section includes a reinforced ring member affixed at an upper most portion of the second upper vertical section.

7. The swimming pool skimmer and chlorinator apparatus, as defined in claim 5, wherein the second lower vertical section has a smaller circumference at a lower most portion as compared to a larger circumference at an upper most portion of the second upper vertical section.

8. The swimming pool skimmer and chlorinator apparatus, as defined in claim 6, wherein the second upper vertical section includes a second concentric axial opening defined by an inner diameter of the reinforced ring member.

9. The swimming pool skimmer and chlorinator apparatus, as defined in claim 5, wherein the second lower vertical section includes a second base member integrally formed with the lower most portion of the second lower vertical section, the second base member having a plurality of perforations therein to allow for the passage of pool water therethrough.

10. The swimming pool skimmer and chlorinator apparatus, as defined in claim 1, wherein the connecting means comprises a hinge member having a first leg portion fixedly attached to the lower axial portion of said bi-sectioned basket member, a second connecting leg portion fixedly attached to the first leg portion, for permanent engagement to the upper axial portion of said bi-sectioned basket member.

11. The swimming pool skimmer and chlorinator apparatus, as defined in claim 10, wherein the second connecting leg portion further includes a plug portion for permanent engagement into a plug receiving portion mounted within a side wall of the upper axial portion of said bi-sectioned basket member and a hinge connection attaching the first connecting leg portion with the second connecting leg portion.

12. The swimming pool skimmer and chlorinator apparatus, as defined in claim 11, wherein the hinge member provides for pivotal movement of the lower axial portion of said bi-sectioned basket member with the upper axial portion of said bi-sectioned basket member.

13. The swimming pool skimmer and chlorinator apparatus, as defined in claim 1, wherein the securing means for releasably securing the upper axial portion of said bi-sectioned basket member to the lower axial portion of said bi-sectioned basket member, comprises a clip assembly.

14. The swimming pool skimmer and chlorinator apparatus, as defined in claim 13, wherein said clip assembly comprises an axial upstanding latch member affixed to a reinforced ring member, the reinforced ring member being affixed to the lower axial portion of said bi-sectioned basket member and a catch member affixed to a first base member of the upper axial portion of said bi-sectioned basket member, for releasably receiving said latch member.

15. The swimming pool skimmer and chlorinator apparatus, as defined in claim 14, wherein the upstanding latch member further comprises at least two elongated, biased prongs, wherein each of the at least two prongs includes a shoulder portion for biased engagement with the catch member.

16. The swimming pool skimmer and chlorinator apparatus, as defined in claim 15, wherein the catch member comprises an inlet for receiving the latch member, wherein the shoulder portion of the at least two prongs biasedly engages with the inlet to secure the upper axial portion of said bi-sectioned basket member with the lower axial portion of said bi-sectioned basket member.

17. The swimming pool skimmer and chlorinator apparatus, as defined in claim 14, wherein the reinforced ring member further comprises a circumferential lip for retention therein of a first base member integrally formed with the upper axial portion of said bi-sectioned basket member.

18. A swimming pool skimmer and chlorinator apparatus for use in the filtering and chemical treatment of water in a swimming pool, comprising:
 a first perforated, open-ended basket member;
 a second perforated, open-ended basket member;
 a connecting means to pivotally engage said first perforated, open-ended basket member to said second perforated, open-ended basket member; and
 a securing means to relasably secure said first perforated, open-ended basket member in axial alignment with said second perforated, open-ended basket member.

19. The swimming pool skimmer and chlorinator apparatus for use in the filtering and chemical treatment of water in a swimming pool, as defined in claim 18, wherein the connecting means comprises a hinge member having a first connecting leg member affixed to said first perforated, open-ended basket member, a second connecting leg member and a hinge connection, connecting the first connecting leg member to the second connecting leg member.

20. The swimming pool skimmer and chlorinator apparatus for use in the filtering and chemical treatment of water in a swimming pool, as defined in claim 18, wherein the securing means further comprises an axial upstanding latch member affixed to said second perforated, open-ended basket member and a catch member affixed to said first perforated, open-ended basket member, wherein the latch member is releasably retained within the catch member for releasably securing said first perforated, open-ended basket member in axial alignment with said second perforated, open-ended basket member.

* * * * *